United States Patent [19]
Aihara et al.

[11] Patent Number: 5,791,030
[45] Date of Patent: Aug. 11, 1998

[54] WEB WIDENING APPARATUS

[75] Inventors: Kintaro Aihara; Kazuhiko Kurihara; Hiroshi Yazawa, all of Tokyo; Yuki Kuroiwa, Saitama-ken; Shuichi Murakami, Tokyo, all of Japan

[73] Assignee: Nippon Petrochemicals Co., Ltd., Tokyo, Japan

[21] Appl. No.: 922,142

[22] Filed: Aug. 25, 1997

[30] Foreign Application Priority Data

Aug. 26, 1996 [JP] Japan .................. 8-223924
Feb. 5, 1997 [JP] Japan .................. 9-022577

[51] Int. Cl.⁶ ............................................. D06C 3/06
[52] U.S. Cl. .............. 26/87; 26/75; 26/97; 26/100; 26/101; 26/105
[58] Field of Search .................. 26/74, 75, 51.5, 26/87, 88, 90, 97, 99, 100, 101, 103, 104, 105, 106

[56] References Cited

U.S. PATENT DOCUMENTS

| | | | |
|---|---|---|---|
| 829,805 | 8/1906 | Sackville | 26/104 |
| 898,270 | 9/1908 | Schneider | 26/100 |
| 1,132,033 | 3/1915 | Richardson | 26/100 |
| 1,347,714 | 7/1920 | Rowley | 26/105 |
| 1,525,427 | 2/1925 | Richardson | 26/100 |
| 1,642,496 | 9/1927 | Hinnekens | 26/100 |
| 1,867,550 | 7/1932 | Cameron et al. | 26/100 |
| 2,067,300 | 1/1937 | Willis et al. | 26/100 |
| 3,042,989 | 7/1962 | Foley | 26/100 |
| 3,509,607 | 5/1970 | Fleissner | 26/101 |
| 3,828,998 | 8/1974 | Gross | 26/105 |
| 4,007,865 | 2/1977 | Crandall | 26/97 |
| 4,646,403 | 3/1987 | Nasu | 26/100 |

FOREIGN PATENT DOCUMENTS

| | | | |
|---|---|---|---|
| 9294 | 4/1980 | European Pat. Off. | 26/97 |
| 2501136 | 5/1996 | Japan . | |
| 20280 | 12/1890 | United Kingdom | 26/100 |
| 328124 | 4/1930 | United Kingdom | 26/100 |

*Primary Examiner*—Amy B. Vanatta
*Attorney, Agent, or Firm*—Weingarten, Schurgin, Gagnebin & Hayes LLP

[57] ABSTRACT

A relatively inexpensive web widening apparatus which is suitable for the manufacture of a widened web having a large width and a lightweight web while maintaining a high widening ratio and the uniformity of the web and can be operated with ease at a high efficiency comprises a widening tool in contact with the web, having first and second groups of widening plates arranged in a width direction of the web to face each other, at least one pair of cross guiders which can nip both side end portions of the web, and guide means for moving the widening plates of the first and second groups in such a manner that the interval between the widening plates expands gradually as they rotate and then narrows gradually.

33 Claims, 13 Drawing Sheets

WEB WIDENING APPARATUS

BACKGROUND OF THE INVENTION

1. Field of the Invention

This invention relates to an apparatus for widening a travelling web in a transverse direction thereof.

2. Background Art

Heretofore, there has been a method for manufacturing a laminate nonwoven fabric, which comprises the steps of forming a split web by making in a longitudinal direction thereof a large number of long splits (breaks) in a film drawn in a longitudinal direction thereof or a slit web having discontinuous breaks in a longitudinal direction thereof and drawn in a longitudinal direction thereof, and widening the split web or slit web in a transverse direction thereof. As shown in FIG. 18A, a first type of laminate nonwoven fabric is obtained by laminating widened double-layer split webs or slit webs "a" arranged in longitudinal and transverse directions thereof. As shown in FIG. 18B, a second type of laminate nonwoven fabric is obtained by laminating a widened split web or slit web "a" and other web, e.g., a horizontal slit web "b" obtained by making a break in a transverse direction of the web and drawing. The nonwoven fabric woven using widened webs are light in weight, has strength, gas permeability and dimensional stability and is widely used alone or as a reinforcement for other materials.

It is known that a cross guider, curved rubber roll, curved rod, screw roll having a screw groove in a cylindrical surface and the like are used to pull both side end portions of a web in a width direction of the web as widening means for obtaining a widened web. However, with a method for widening a web using one of these devices, it is difficult to obtain a high widening ratio and the uniformity of a widened web is unsatisfactory. Further, when the widening state is changed by fluctuations in the properties of a web during a widening operation, it is difficult to handle it.

A web widening apparatus disclosed in Japanese Patent Publication No. Sho 46-43275 has been developed in view of this. This apparatus uses a large number of coil springs which are arranged at a predetermined pitch in a travelling direction of a web and expand in a width direction of the web. These coil springs expand in the width direction of a web gradually while moving in a travelling direction of the web. The travelling web is widened in the width direction of the web while carried on the coil springs. The web can be widened uniformly at a high widening ratio by using a plurality of the apparatuses.

However, this web widening apparatus has the following problems. That is, since a large number of coil springs are moved in a travelling direction of a web and expand in a width direction of the web, the structure of the apparatus becomes relatively complicated, resulting in high costs. Further, the apparatus is not suitable for the manufacture of a widened web having a large width or a lightweight web due to the characteristic properties thereof, has a limit in speed and requires a great deal of skill for operation.

It is therefore an object of the present invention to provide a relatively inexpensive web widening apparatus which has solved the above problems, is suitable for the manufacture of a widened web having a large width or a lightweight web while maintaining a high widening ratio and the uniformity of the web, and is operated with ease at a high efficiency.

SUMMARY OF THE INVENTION

The present invention has been made in view of the above problems and provides a web widening apparatus to solve the above problems. The web widening apparatus of the present invention comprises:

a widening tool having: a shaft; a plurality of widening plates in contact with a travelling web to be widen, arranged in parallel to one another around said shaft, the widening plates comprising a first group and a second group of widening plates which can rotate around the shaft and move in an axial direction of the shaft, said second group of widening plates being separated from and facing said first group of widening plates in the axial direction of the shaft; and guide means for moving the first and second groups of widening plates in the axial direction of the shaft so that the interval between the widening plates of the first and second groups in the axial direction of the shaft expands gradually along with the rotation of the widening plates and then narrows; and a pair of cross guider which can nip both side end portions of the travelling web and face each other in a width direction of the web.

In the above constitution, the widening tool expands the width of a central portion of the web to a large extent but the widths of outer portions to a small extent. The cross guiders can widen the web to a desired width but does not expand the central portion of the web to a large extent. Then, when the widening tool and the cross guiders are arranged and used continuously, the web can be widened with uniform apertures along the entire width thereof. By adjusting the attached guide means, changes in the expansion of the width of the web caused by the type and properties of the web can be controlled with ease. Adjustment by the guide means can be carried out during the operation of the apparatus. In this point, this apparatus greatly differs from a similar expander roll or screw roll.

Although a curved body has the function of increasing the interval of fibers in details uniformly excluding both end portions of the web, it is difficult to finely control a small change in widening state caused by fluctuations in the properties of the web. To cope with this problem, a widening tool, cross guiders and a curved body are combined to make the most of their merits and compensate for their demerits in widening the web over a large width uniformly and stably. Since this widening apparatus has a relatively simple structure, it facilitates a widening operation and can be operated at a high efficiency.

The guide means can move the first and second groups of widening plates symmetrically in an axial direction of the shaft. The guide means can also adjust the moving distances of the first and second groups of widening plates independently along the axial direction of the shaft.

A contact portion with the web of each of the widening plates of the first and second groups can be made a curved surface and these curved surfaces of the widening plates can be arranged around the shaft continuously to form them as a peripheral surface of a substantially cylindrical body. Alternatively, the contact portion with the web of each of the widening plates of the first and second groups can be made a flat surface and the flat surfaces of the widening plates can be arranged around the shaft continuously to form them as a peripheral surface of a substantially polygonal column body.

The above guide means comprises cam boards which are connected to the widening plates rotating around the shaft such that the widening plates can be in slide contact with the cam boards and the cam boards can be inclined with the respect to the shaft, and inclination units for inclining the cam boards with respect to the shaft. The guide means preferably can change an inclination thereof with respect to the shaft.

The widening tool can further comprise a plurality of widening plates which are interposed between the first and second groups of widening plates and can rotate around the shaft but does not move in the axial direction of the shaft.

As the above widening tool comprising the guide means may be directly used a general-purpose apparatus which is widely used for the removal of wrinkles and positional control for a fabric or nonwoven fabric in a transverse direction thereof in the step of handling it, for example, a product of Toyo Kikai Tsusho Kabushiki Kaisha known under the trade name of "Webster" or "Strut Expander".

As the cross guiders may also be directly used a general-purpose apparatus which is widely used for the removal of wrinkles and positional control for a fabric or nonwoven fabric in a transverse direction thereof in the step of handling it. The cross guiders have the function of pulling both end portions of a travelling web in a width direction thereof by a pinch force or a friction force and may be of a type that friction force is generated by the tension of the web while a plane including axes of a pair of pinch rolls or a pair of rolls close to each other is inclined or twisted with respect to a plane including the surface of the web, a disk type or caterpillar type. Depending on the type of a web, it is preferred in some cases that a cross guider of a pinch roll type in which the axis of one roll and the axis of the other roll should be within the same plane and one of the rolls is inclined to the other thereof such that the space between the ends of the rolls of the cross guider is slightly opened toward the center of the travelling web.

The curved body comprises a curved roll and spiral web-guide means for guiding the web, which is a groove formed on the surface of the curved roll or a spiral convex portion provided around the surface of the curved roll. The spiral web-guide means of the curved body is forcedly rotated by an external drive unit at a required speed so as to obtain a widening effect when it is rotated at a higher speed than the travelling speed of the web.

It is possible to provide means for heating the travelling web before and during a widening operation in some cases and to provide an unrotatable guide rod in the travelling course of the web.

Further, in the present invention, it is preferred to adjust the width of the web to a desired width by detecting the positions of the side end portions of the web. In the travelling course of the web it is possible to arrange detection means for detecting the width of the widened web and to provide control means for operating the guide means such that the width of the web is expanded to a predetermined width in accordance with the output of the detection means.

Preferably, the above cross guider comprises opening/closing means for opening and closing a space between the above pair of rolls by inclining one of the rolls of the cross guiders to the other thereof in accordance with the position of the side end portion of the web. When the cross guider comprises the above opening/closing means, the above control means also operates the guide means such that the width of the web is adjusted to a predetermined width in accordance with the frequency of opening and closing operations of the space between the ends of the rolls of the cross guider within a predetermined time.

BRIEF DESCRIPTION OF THE DRAWINGS

These objects and advantages of the present invention will become clear from the following description with reference to the accompanying drawings, wherein.

DETAILED DESCRIPTION OF THE PREFERRED EMBODIMENTS

The present invention is described in detail hereinunder with reference to embodiments shown in FIGS. 1 to 17B.

Figure 1:
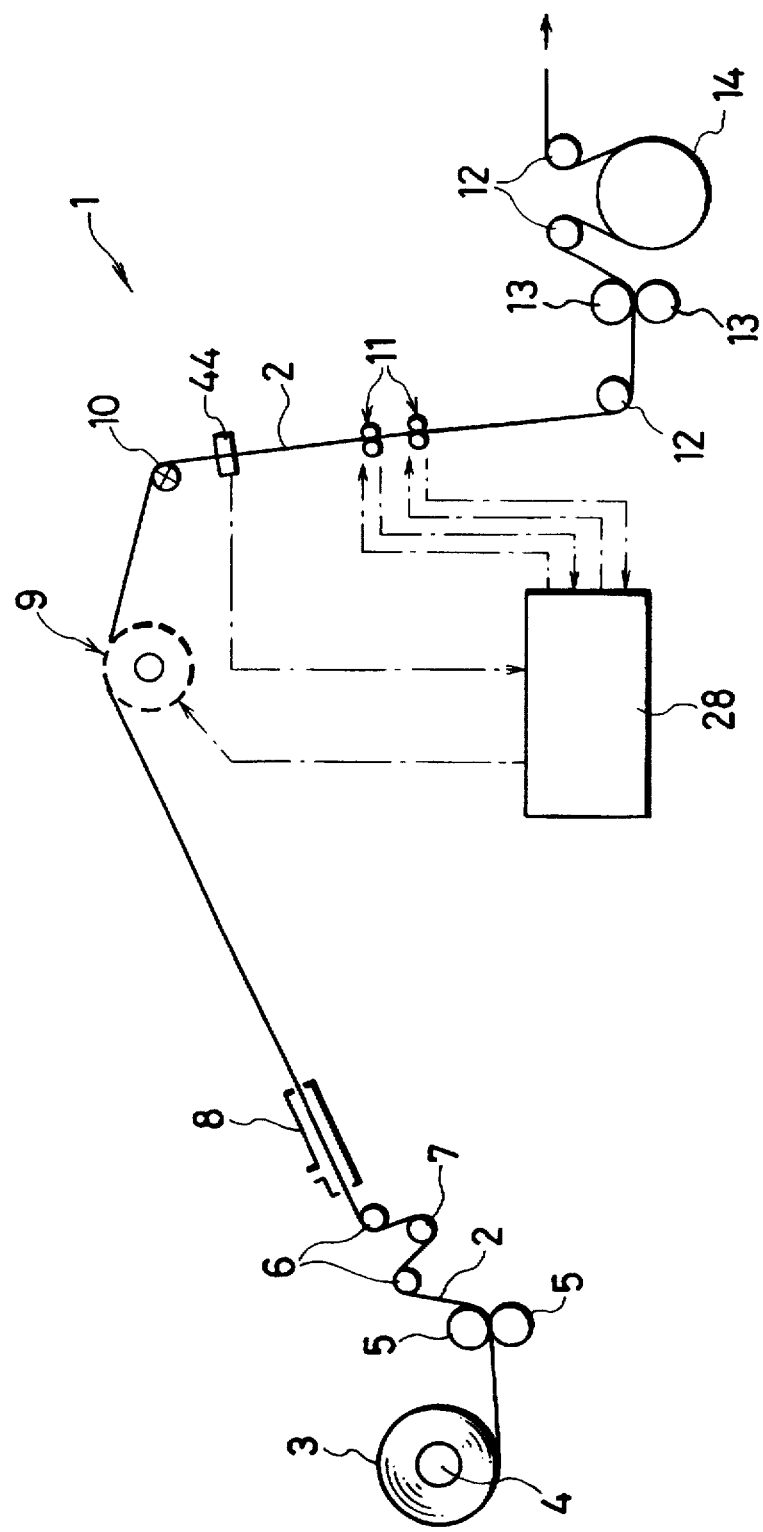
FIG. 1 is a schematic diagram showing a web widening apparatus according to an embodiment of the present invention when seen from the side of the apparatus.
Figure 2:
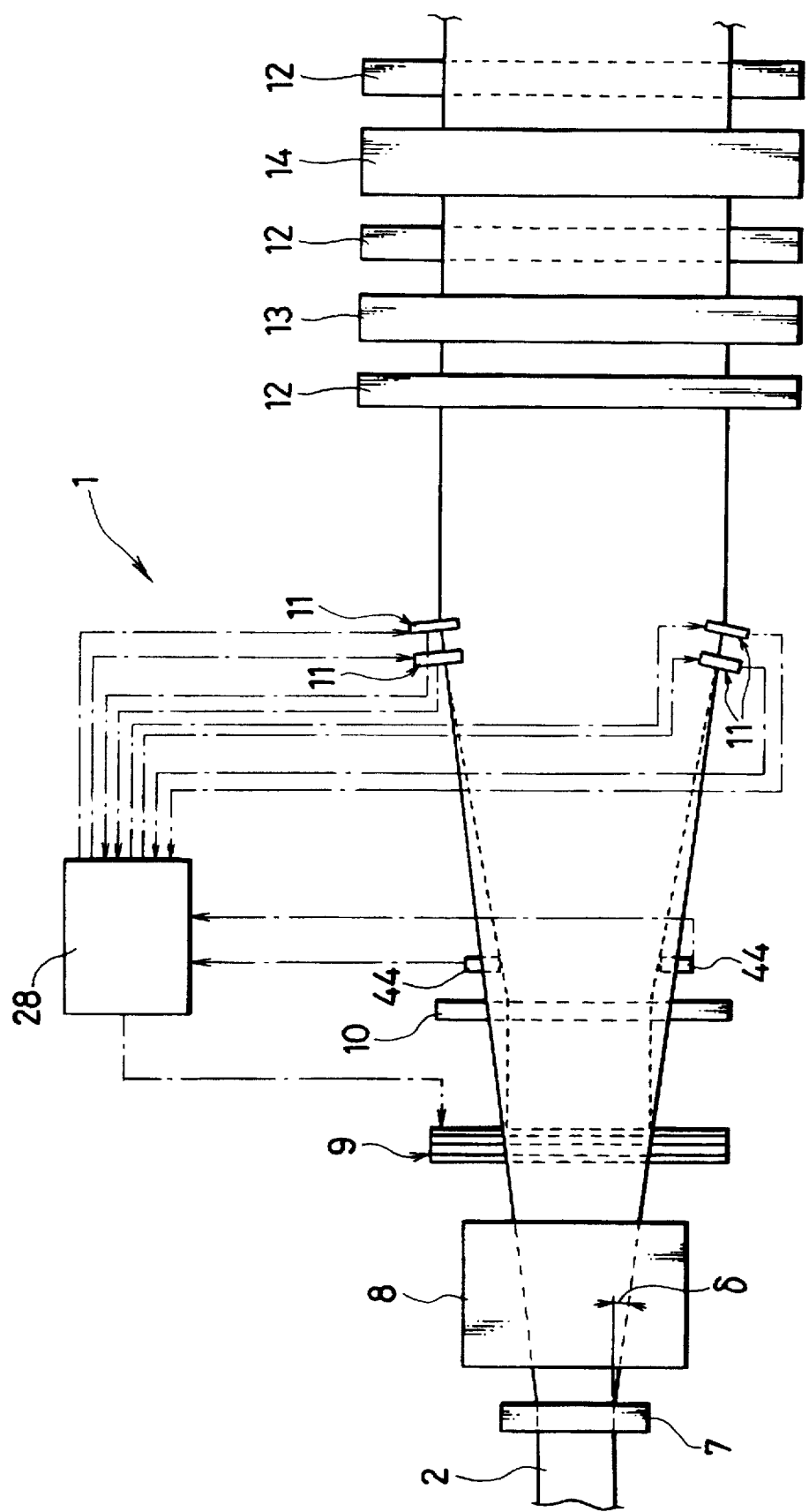
FIG. 2 is a schematic diagram showing the travelling course of a web in the above embodiment when seen from above the web.

FIG. 1 is a schematic side view showing the configuration of a widening apparatus 1 of the present invention, and FIG. 2 is a schematic plan view showing the travelling course of a web when seen from above the web. In FIGS. 1 and 2, the web widening apparatus 1 has a frame (not shown), a delivery unit 4 (only a shaft thereof is shown) for supporting a roll 3 of a web 2, a pair of delivery pinch rolls 5, 5, a pair of guide rolls 6, 6 arranged in a travelling direction of the web, a tension control sensor roll 7 arranged between the guide rolls 6, 6, an annealing chamber 8 and a widening tool 9 and they are arranged on the web delivery side of the widening apparatus 1.

The web is let out from the roll 3 by being pulled by the delivery pinch rolls 5, 5, passes over the guide rolls 6, 6 and is guided to the widening tool 9. At this point, the tension of the web 2 is controlled to a predetermined level by the tension control sensor roll 7 and the delivery pinch rolls 5, 5. The annealing chamber 8 comprises a duct including a fan and a heater to remove distortion and unevenness from the web passing through the annealing chamber 8 by blowing hot air to the travelling web to make uniform the properties of the web.

When the web 2 is kept while wound on the roll 3, irregular winding may occur in the web 2, thereby making it impossible to widen the web 2 uniformly. In this embodiment, the web 2 is let passing through the annealing chamber 8 to remove distortion and unevenness from the web, whereby irregular winding is prevented from affecting the subsequent widening operation.

When the web is widened, side end portions thereof are distorted, which may cause such a trouble as winding around cross guiders. The generation of such distortion can be prevented by heating the side end portions of the web 2 intensively before or during a widening operation. This is important when stress is placed on the widening function of the cross guiders. Although heating the whole web in the final step of a widening operation has been carried out conventionally, it is effective in removing distortion produced by the widening of the whole web and making uniform apertures. The annealing chamber may not be used depending on the type and properties of a web and widening ratio.

Further, as shown in FIG. 1, an unrotatable guide rod 10, two pairs of cross guiders 11, 11, three guide rolls 12, 12, 12, pinch rolls 13, 13 and an annealing roll 14 are arranged in the travelling course of the web at a downstream side of the widening tool 9. The guide rod 10 and the cross guiders 11 are sequentially arranged in the travelling direction of the web and the annealing roll 14 is disposed between the guide rolls 12, 12 at a downstream of the pinch rolls 13 to form a web travelling course from the widening tool 9.

Figure 3:
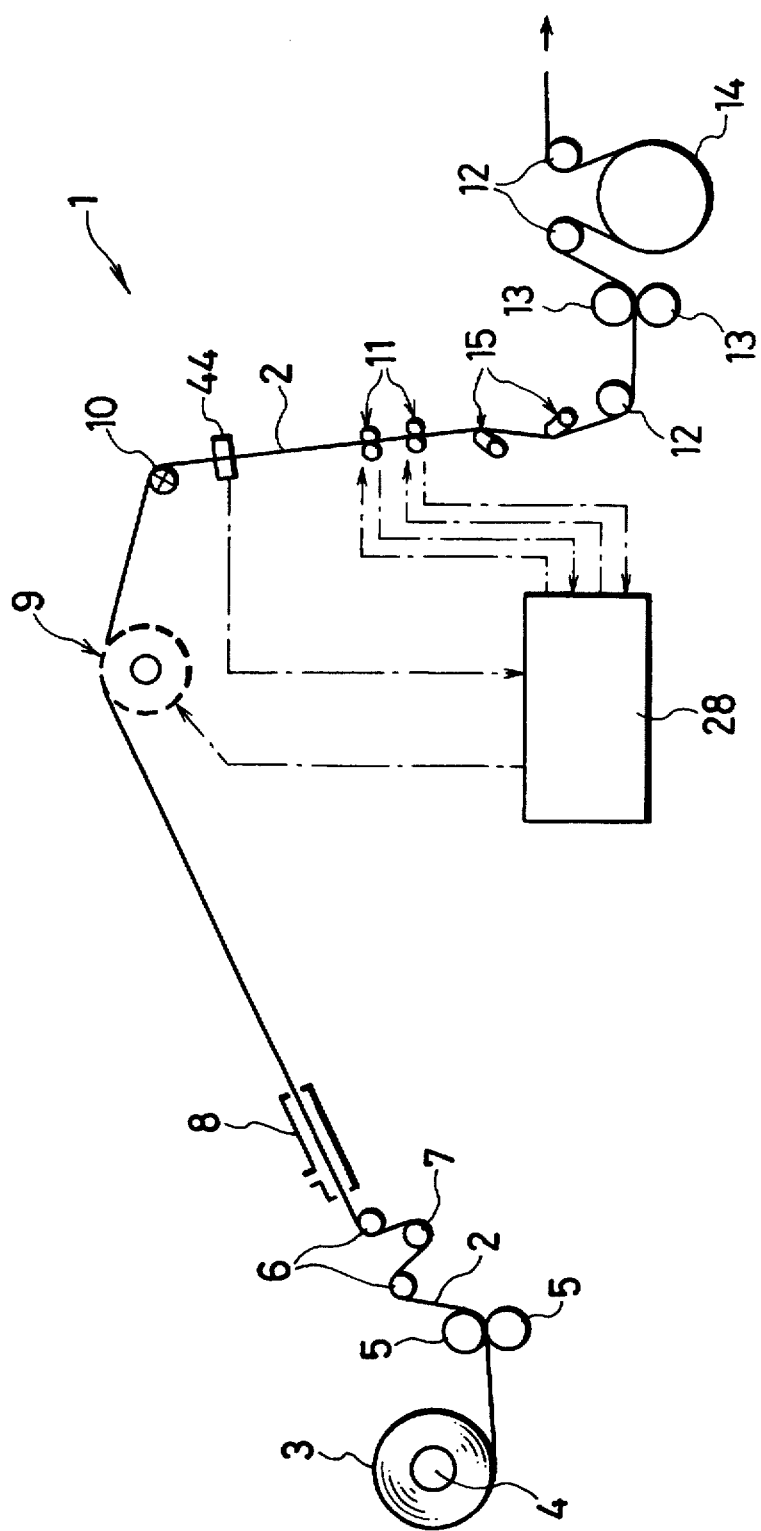
FIG. 3 is a schematic diagram showing the configuration of a second embodiment of the present invention when seen from the side of the embodiment.
Figure 4:
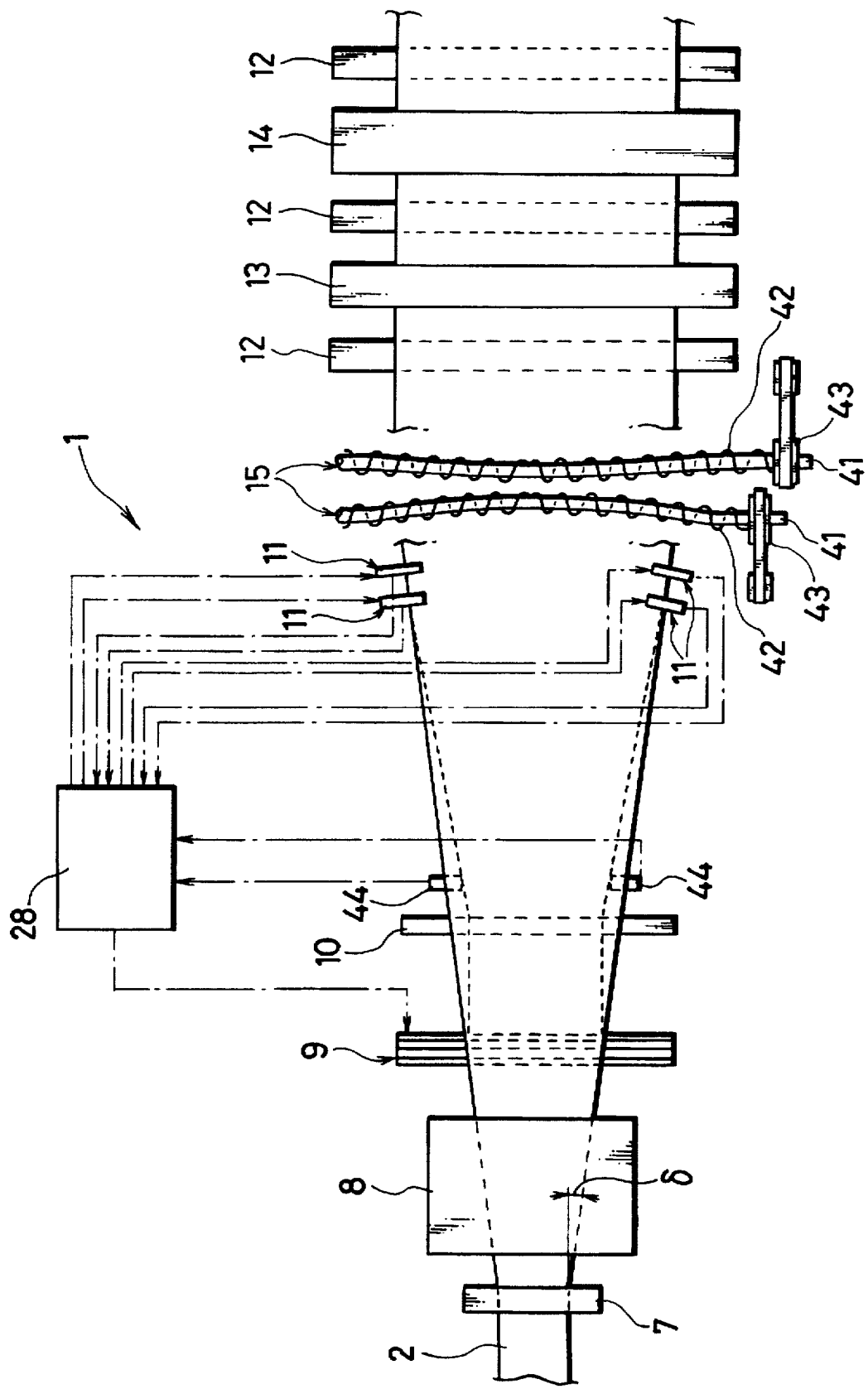
FIG. 4 is a schematic diagram showing the travelling course of the web in the second embodiment when seen from above the web.

FIGS. 3 and 4 show a second embodiment of the present invention. In this second embodiment, two curved bodies 15, 15 are arranged between the two pairs of cross guiders 11, 11 and the three guide rolls 12, 12, 12 at a downstream of the widening tool 9 in the web travelling course. Thus, the guide rod 10, cross guiders 11 and curved bodies 15 may be arranged sequentially in the travelling direction of the web by inserting the curved bodies 15 which have the function of widening the interval of fibers in the details of the web more uniformly.

Figure 5:
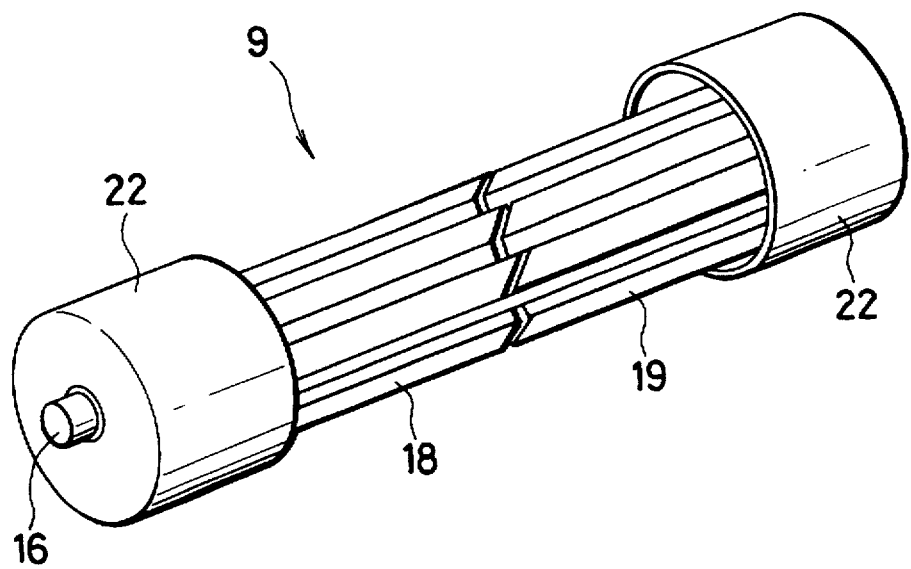
FIG. 5 is a diagram showing the outer appearance of a widening tool according to the present invention.
Figure 6:
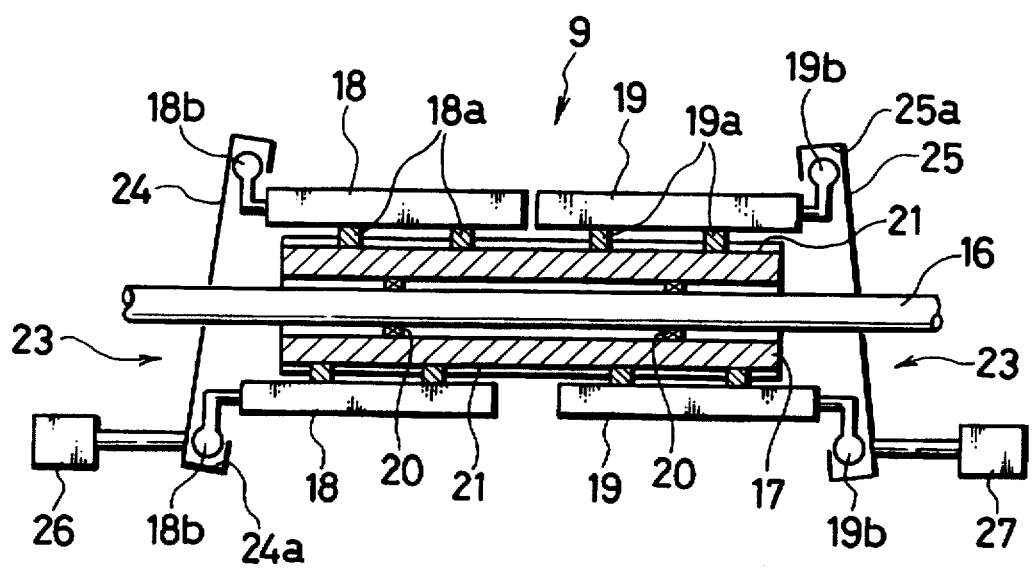
FIG. 6 is a diagram showing the cross section of the widening tool according to the present invention.

FIGS. 5 and 6 show the above widening tool 9. The widening tool 9 comprises a shaft 16, a cylinder 17 penetrated by the shaft 16 and rotatably supported by the shaft 16 and a plurality of widening plates 18, 19 arranged in parallel to each other around the cylinder 17 with the shaft 16 as the center thereof so that the travelling web can contact the widening plates.

The above cylinder 17 can rotate around the shaft 16 by a bearing member 20 interposed between the cylinder 17 and the shaft 16. Grooves 21 are formed on the peripheral surface of the cylinder 17 in an axial direction thereof at positions corresponding to the widening plates 18, 19.

The plurality of widening plates 18, 19 arranged around the shaft 16 along the cylinder 17 are separated into a first group of widening plates 18 and a second group of widening group 19 which face each other in an axial direction of the shaft. The first group of the widening plates 18 and the second group of the widening plates 19 comprise supports 18a, 19a which are inserted into the grooves 21 such that they can slide along the grooves 21 so that the first group of the widening plates 18 and the second group of the widening plates 19 can move in the axial direction of the shaft, respectively. Further, the supports 18a, 19a are provided such that they do not fall off from the grooves 21 toward a radial direction of the shaft.

Figure 7:
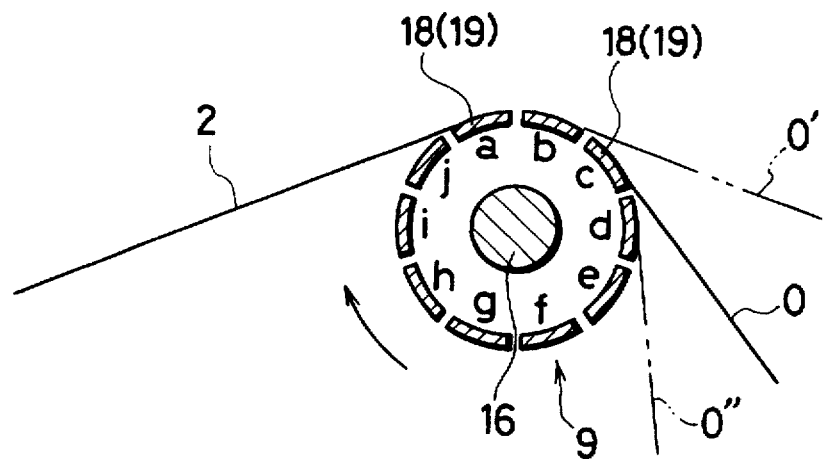
FIG. 7 is a diagram showing the cross section of a curved contact portion with the web of the widening plate according to the present invention.
Figure 8:
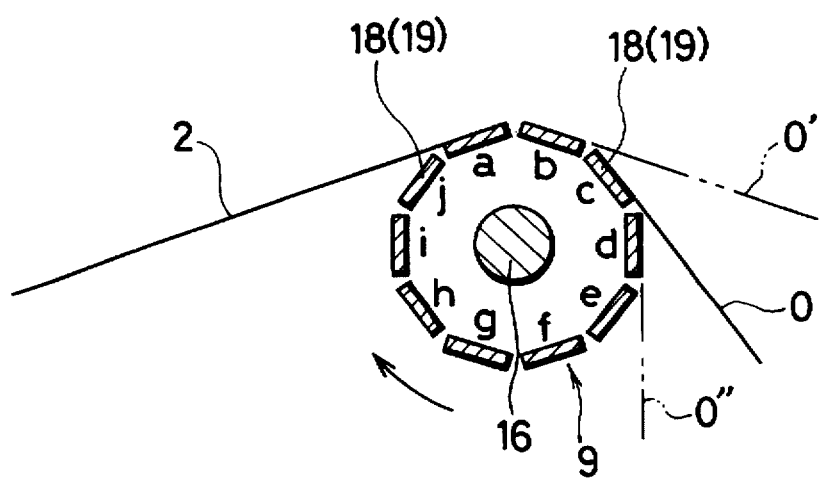
FIG. 8 is a diagram showing the cross section of a flat contact portion with the web of the widening plate according to the present invention.

Thereby, the first group of the widening plates 18 and the second group of the widening plates 19 are separated from each other such that they can approach or go away from each other in the axial direction of the shaft and can rotate around the shaft 16 in a direction of letting out the travelling and contacting web 2 as shown in FIGS. 7 and 8.

Outer surfaces, that is, contact portions with the travelling web of the first group of the widening plates 18 and the second group of the widening plates 19 have all the same shape. The contact portions with the web of the widening plates 18, 19 are made curved surfaces and, as shown in FIG. 7, the first and second groups of the widening plates having these curved surfaces as outer surfaces are disposed around the shaft (around the cylinder) continuously to form them as a peripheral surface of a substantially cylindrical body around the cylinder with the shaft as the center thereof. In this case, the sectional form of the contact portion of each widening plate 18, 19 is formed as an arc along a circular line drawn with a fixed radius R from the center of the shaft. The length of the web 2 in contact with the widening plates 18, 19 in a travelling direction of the web can be changed by changing the position where the web is let out from the widening plates 18, 19 as shown by O, O', or O".

As a variation of this embodiment, the contact portions with the web of the widening plates 18, 19 are made a flat surface and, as shown in FIG. 8, the first and second groups of the widening plates having the flat surface as an outer surface may be disposed around the shaft (around the cylinder) continuously to form them as a peripheral surface of a substantially polygonal column body around the cylinder with the shaft as the center thereof.

As described above, the first group of the widening plates 18 and the second group of the widening plates 19 move in the axial direction of the shaft while rotating. In this embodiment, the first group of the widening plates 18 and the second group of the widening plates 19 are provided such that they move in opposite directions along the axial direction of the shaft with the center in a longitudinal direction of the shaft 16 as the center thereof and the interval between the widening plates 18, 19 which face each other in the axial direction of the shaft increases gradually in accordance with rotation position and then decreases gradually. For instance, in FIG. 6, the interval between the first group of the widening plates 18 and the second group of the widening plates 19 located on an upper side is minimum and the interval between the first group of the widening plates 18 and the second group of the widening plates 19 located on a lower side is maximum. FIG. 6 illustrates the minimum interval between the first group 18 and the second group 19 and the maximum interval therebetween in the axial direction of the shaft on upper and lower sides, respectively, to facilitate explanation. This is explained as follows with reference to the rotation position of the widening plates shown in FIGS. 7 and 8. That is, the first group of the widening plate 18 and the second group of the widening plate 19 on an upper side shown in FIG. 6 are located at a rotation position "a" in FIGS. 7 and 8 and the first group of the widening plate 18 and the second group of the widening plate 19 on a lower side shown in FIG. 6 are located at a rotation position "e" in FIGS. 7 and 8. The interval between the widening plates 18, 19 increases gradually as they move to rotation positions "a", "b", "c", "d" and "e" whereas the interval therebetween decreases gradually as they move to rotation positions "f", "g", "h", "i" and "j".

As shown in FIG. 5, cylindrical covers 22 for covering outer end portions of the first group of the widening plates 18 and the second group of the widening plates 19 are provided at respective end portions of the widening tool 9 and guide means 23 for moving the widening plates in the axial direction of the shaft are provided inside the respective covers 22. The guide means 23, 23 comprise cam boards 24, 25 installed in such a manner that they can be inclined with respect to the shaft 16, and actuators 26, 27 as inclination units for changing inclinations of the cam boards 24, 25 with respect to the shaft 16, respectively. Cam followers 18b, 19b provided at outer end portions of the widening plates 18, 19 are fitted in guide grooves 24a, 25a formed at the peripheries of the cam boards 24, 25 in such a manner that the cam followers can slide along the guide grooves 24a, 25a, respectively.

The actuators 26, 27 of the guide means 23 can be operated to change inclinations of the cam boards 24, 25, respectively. In this embodiment, control means 28 for operating the actuators 26, 27 in response to a signal from a sensor for detecting the width of the web 2 which will be described hereinafter is connected to the guide means 23, 23 and the cam boards 24, 25 are inclined under the control of the control means 28 to move the widening plates as follows.

When inclinations of the cam boards 24, 25 are increased, the maximum distance of the interval in the axial direction of the shaft between the first group of the widening plate 18 and the second group of the widening plate 19 which face each other can be expanded. Normally the two cam boards 24, 25 are moved the same distance (inclined symmetrically with the center of the shaft 16 as the center thereof) to move the first group of the widening plate 18 and the second group of the widening plate 19 symmetrically in the axial direction of the shaft. The two cam boards 24, 25 may be moved independently to adjust the moving distances of the first group of the widening plate 18 and the second group of the widening plate 19 independently along the axial direction of the shaft.

Figure 9:
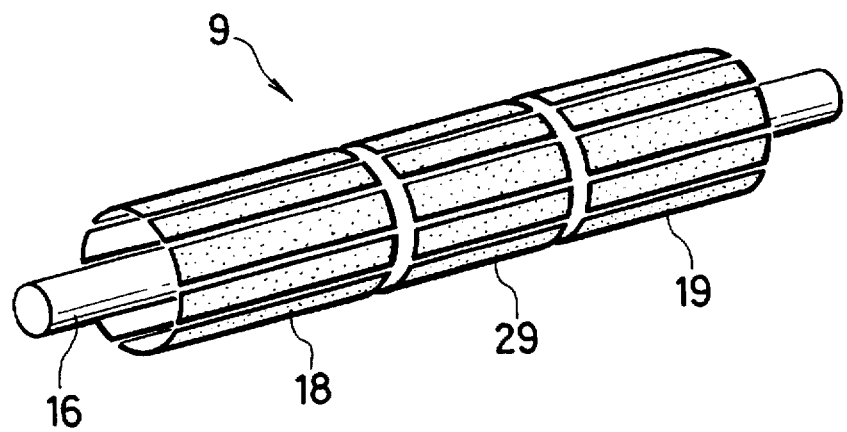
FIG. 9 is a diagram showing a variation of the widening tool according to the present invention comprising a third group of widening plates.
Figure 10:
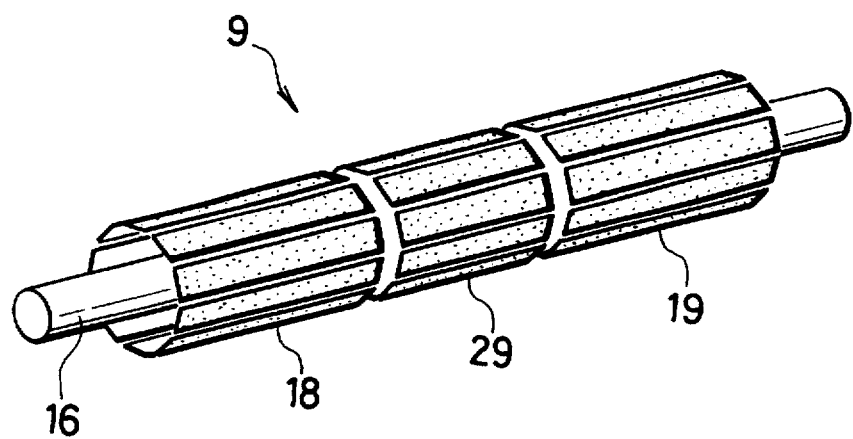
FIG. 10 is a diagram showing another variation of the widening tool according to the present invention comprising a third group of widening plates.

FIGS. 9 and 10 illustrate variations of the widening tool 9. Each of the widening tools 9 shown in FIGS. 9 and 10 comprises a first group of widening plates 18 and a second group of widening plates 19 which can rotate around a shaft 16 and move in an axial direction of the shaft like the above widening tool, and further a third group of widening plates 29 which are interposed between the first group of widening plates 18 and the second group of widening plates 19, can rotate around the shaft 16 and does not move in the axial direction of the shaft. The first group of the widening plates 18 and the second group of the widening plates 19 are moved in the axial direction of the shaft by the operations of the above cam boards. This embodiment is the same as the above embodiment in this point. The guide means are omitted in FIGS. 9 and 10 to facilitate explanation. The widening plates 18, 19, 29 shown in FIG. 9 have curved contact portions with the web like the widening plates shown in FIG. 7 whereas the widening plates 18, 19, 29 shown in FIG. 10 have flat contact portions with the web like the widening plates shown in FIG. 8. The widening tool having the third group of the widening plates is effective when a central portion of the web is apt to be excessively widened.

In the above embodiment, the guide means are arranged on respective outer sides of the groups of widening plates to face each other. The guide means may be disposed inside a cylindrical area surrounded by the groups of widening plates. In this case, the essential function of the guide means does not change as a matter of course. It is desired that the surface of each widening plate be made rough or made from a non-slippery material to increase frictional force.

Figure 11:
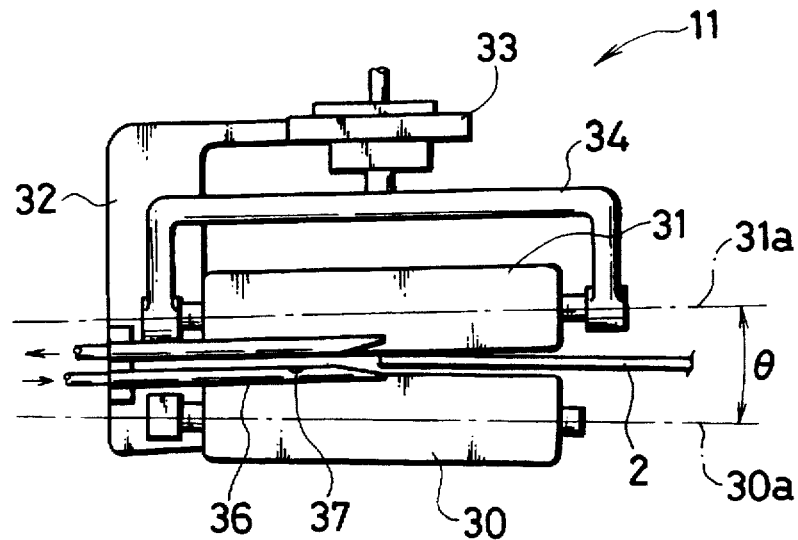
FIG. 11 is a diagram showing an example of cross guider according to the present invention seen from a web travelling direction.
Figure 12:
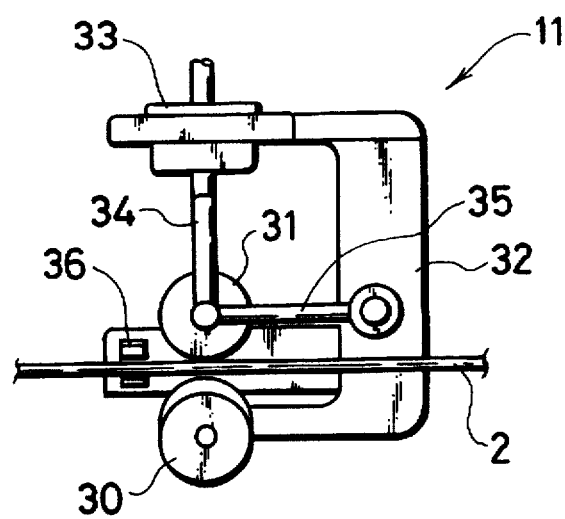
FIG. 12 is a diagram showing another example of cross guider according to the present invention seen from a web width direction.

FIGS. 11 and 12 illustrate the details of a roll type cross guider 11. The cross guider 11 basically comprises a pair of rolls 30, 31 which nip a side end portion of the travelling web 2 in a thickness direction of the web while rotating to enable the travelling of the web. The axis 30a of one roll 30 and the axis 31a of the other roll 31 are within the same plane and one of the rolls of the cross guider is inclined the other thereof to form an angle θ so that the space between the ends of the rolls of the cross guider 11 is slightly opened toward the center of the travelling web 2. The two cross guiders 11 are disposed to face each other in the width direction of the web as a pair. In the illustrated embodiment, two pairs of cross guiders 11 are arranged in the travelling direction of the web 2.

In each of the cross guiders 11, at least one of the rolls 30, 31 is made from an elastic material such as rubber. The side end portion of the web 2 is nipped between the rolls 30, 31. Since one of the rolls is inclined to the other one so as to form the angle θ therebetween as described above, a space as large as not less than 2 times and not more than 30 times the thickness of the web 2 is formed between the rolls at a side end portion thereof on an open side of the cross guider 11. Therefore, force for pulling the web at a portion of the web nipped between the rolls 30, 31 outward in the width direction of the web decreases toward the center of the web. If these rolls 30, 31 are pressed and contacted to each other entirely, the interval between fibers in the portion of the web nipped between these rolls cannot be expanded. Since large pull force works discontinuously at the boundary of the nipped portion, the portion is easily torn vertically. The inclined arrangement of these rolls 30, 31 can solve the above two problems.

One roll 30 of the cross guider 11 is installed at a fixed position of a roll base 32 and the other roll 31 is supported by opening/closing means comprising an air pressure diaphragm 33 and an arm 34 which extends from the air pressure diaphragm 33 and can move in the thickness direction of the web so that the roll 31 can approach or go away from the roll 30. Another arm 35 is provided from the roll base 32 to the arm 34 and supports the arm 34 such that the arm 34 does not turn with the air diaphragm as the center thereof, whereby the movement of the other roll 31 is limited to a predetermined plane including the axes 30a, 31a of the rolls 30, 31. That is, when the space between the ends of the rolls of the cross guider is opened or closed by the opening/closing means and the other roll 31 is contacted to the travelling web, the arm 34 does not turn with the air diaphragm as the center thereof.

Further, an air pressure sensor 36 for detecting the side end portion of the web 2 is provided in each of the cross guiders 11. The air pressure sensor 36 comprises a pair of upper and lower air tubes which are spaced apart from each other with a space therebetween where the web can enter and has an air hole 37 in the lower air tube. Air is always discharged from the air hole 37 and absorbed to the other upper air tube. When the side end portion of the web 2 comes to the position of the air hole 37 by the pull function of the cross guider 11, an air flow between the air tubes is cut off and the air pressure sensor 36 detects this cut-off and sends a signal to the control means 28. The opening or closing operation of the cross guider 11 is carried out under the control of the control means 28 which receives this signal. That is, when the side end portion of the web reaches the position of the air hole 37, the air pressure sensor 36 moves an air valve (not shown) to activate the above air pressure diaphragm 33, whereby the web is released from the cross guider 11 temporarily. Immediately after the side end portion of the web 2 leaves the position of the air hole 37 (the side end portion moves in a direction that the width of the web decreases), it is nipped again. This is repeated, thereby expanding the width of the web 2 to a desired width.

To detect the width of the web, for example, a contact type or photoelectric sensor may be used other than the above air pressure sensor. Although the above function can be attained fully by only one pair of cross guiders in most cases, as the web falls off from the cross guiders in some cases, two pairs of cross guiders are preferably used. Disk type and belt type cross guiders may be used.

Figure 13A:
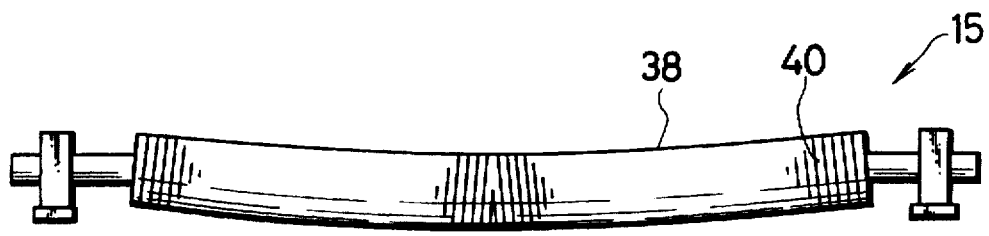
FIG. 13A is a diagram showing an entire curved body having a spiral groove as spiral web-guide means according to the present invention.
Figure 13B:
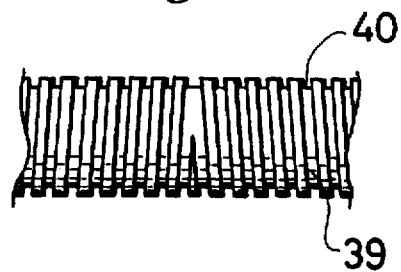
FIG. 13B is a diagram showing a central portion of the curved body of FIG. 13A according to the present invention.

FIGS. 13A and 13B are diagrams of a curved body provided in the widening apparatus 1 of the second embodiment shown in FIGS. 3 and 4. FIG. 13A shows the entire curved body having a spiral groove 39 on the outer peripheral surface of a commercially available curved rubber expander roll 38. A conventional expander roll rotates along with a contacting and travelling belt body (such as the web) while it maintains a curving direction thereof and is used to smooth out wrinkles from the belt body or prevent the generation of wrinkles. In this embodiment, spiral web-guide means 40 for guiding the web, which is bilaterally symmetrical around a central portion of the web as shown in FIG. 13B, is formed by making the symmetrical spiral groove 39 on the peripheral surface of the curved expander roll 38 arranged in the width direction of the web. Further, the axis of the curved body is rotated forcedly by an external drive unit (not shown), the spiral web-guide means rotates while maintaining a curving direction of the curved body as in the prior art, this rotation direction is the direction of letting out the travelling and contacting web, and the winding direction of the spiral web-guide means 40 is a direction for expanding the width of the web while the spiral web-guide means 40 rotates as will be described hereinafter.

Figure 14:
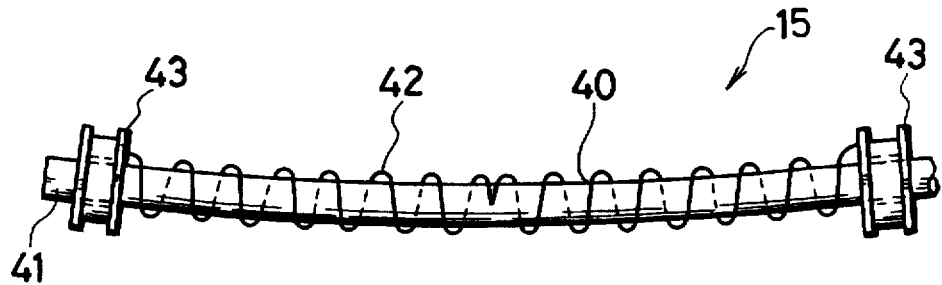
FIG. 14 is a diagram showing another example of the curved body having a spiral linear material as spiral web-guide means according to the present invention.

FIG. 14 shows another curved body comprising a fixed and curved roll 41 as a shaft and spiral web-guide means 40 which is formed by winding a spiral linear material 42, e.g. a wire, bilaterally symmetrically around the curved roll 41. The linear material 42 is driven by an external motor through pulley 43, 43 rotatably provided on the curved roll 41 to rotate around the fixed rod material 41 as in the above embodiment.

The principle of widening the web by the curved body is as follows.

As a so-called screw roll of the prior art which has a spiral groove in a normal cylinder also has the function of catching fibers in the groove and moving the caught fibers outward along with the rotation thereof, it has a certain degree of widening function. However, as the web goes farther from the center of the screw roll, the inclination angle of the fiber of the travelling web increases so that the function of removing the fiber from the groove by travelling tension and the function of narrowing the widened web become large. As a result, a large widening ratio cannot be obtained and an increase in the aperture between adjacent fibers cannot be expected except the central portion of the web. Since the curved body of the present invention is curved per se, the fiber catching function of the spiral web-guide means which is the groove or the spiral convex portion on or around the curved roll can be made larger as the distance from the central portion of the web increases and the fiber is hardly removed. Therefore, by adjusting the following conditions, the function of removing each fiber from the spiral web-guide means by tension and the function of catching each fiber can be well balanced at a predetermined widening position. Further, since the balancing position changes continuously, the apertures between adjacent fibers in details become uniform.

Figure 15A:
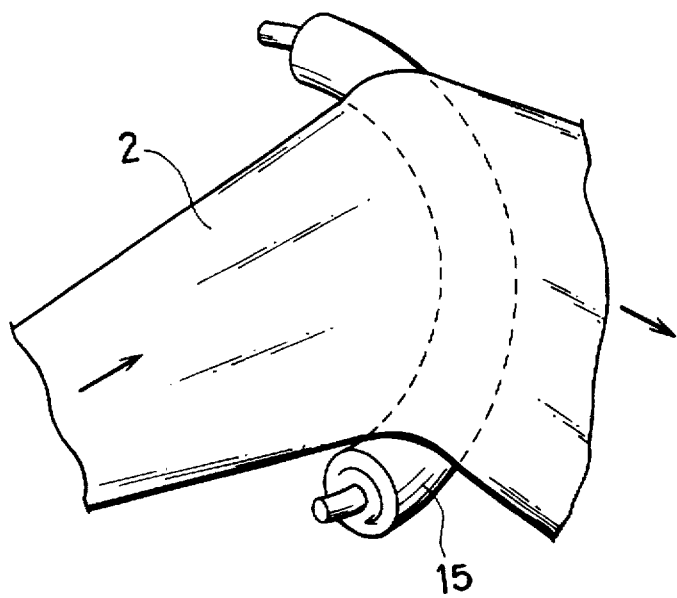
FIG. 15A shows the web in contact with the curved body according to the present invention when seen from the side of the web.
Figure 15B:
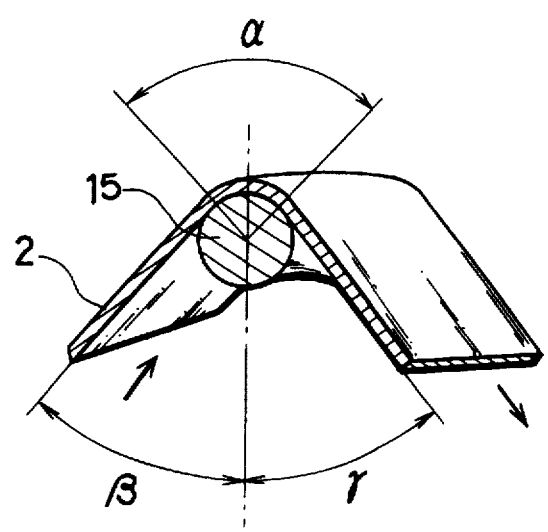
FIG. 15B shows the web in contact with the curved body according to the present invention when seen from the sectional direction of the curved body.

FIGS. 15A and 15B show the web 2 which is in contact with the curved body 15 (the spiral web-guide means and the fibers of the web are omitted to avoid intricacy). Generally, the degree of widening changes according to the curvature of the curved body, contact angle $\alpha$, input angle $\beta$ and output angle $\gamma$ with respect to the plane including the axis of the curved body. As the angle $\alpha$ is larger and the input angle $\beta$ and the output angle $\gamma$ are closer to each other, the widening function increases. Further, as the tension of the web is larger, the pitch of the spiral web-guide means is larger and the rotation speed of the curved body relative to the travelling speed of the web is higher, the widening function thereof increases. However, when there is some defect in the web made from a material which is easily torn, the web is liable to be caught by the spiral web-guide means and greatly torn. In addition, there is a strong tendency that the tear spreads afterwards and does not disappear autonominously. In this case, these conditions are made as mild as possible and a plurality of curved bodies are used stepwise, or stress is placed on the function of adjusting the apertures in details without using a widening function so often.

These factors affecting a widening operation work very delicately depending on the type of the web. When one of the conditions is changed, it affects other conditions immediately. Therefore, apart from the case where the type of the web is greatly changed, controlling changes in the width of the web caused by differences in part of the properties of the same web by adjusting these elements during operation is not practical in many cases.

Figure 16A:
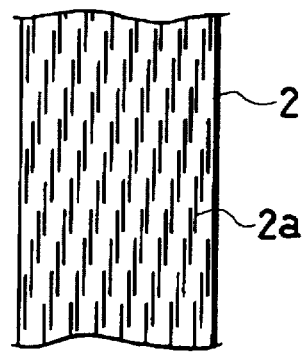
FIG. 16A shows a split web before widening.
Figure 16B:
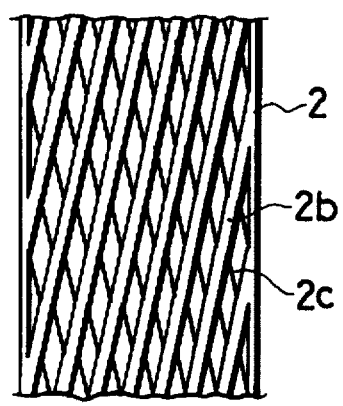
FIG. 16B shows the widened split web.

FIG. 16A shows a split web before widening as an example of the web 2 used and FIG. 16B shows the split web shown in FIG. 16A widened by the widening apparatus shown in FIGS. 1 and 2 or the widening apparatus shown in FIGS. 3 and 4. In these figures, 2a denotes a split, 2b a trunk fiber and 2c a branch fiber.

Figure 17A:
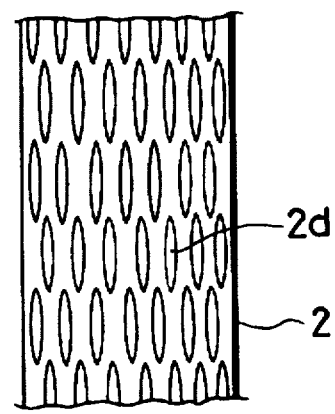
FIG. 17A shows a split web before widening.
Figure 17B:
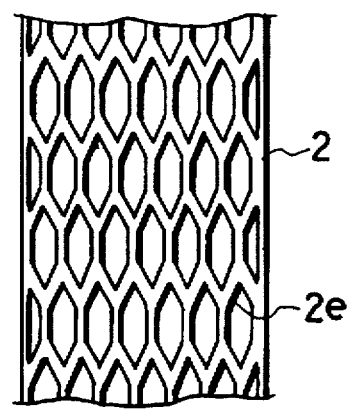
FIG. 17B shows the widened slit web.
Figure 18A:
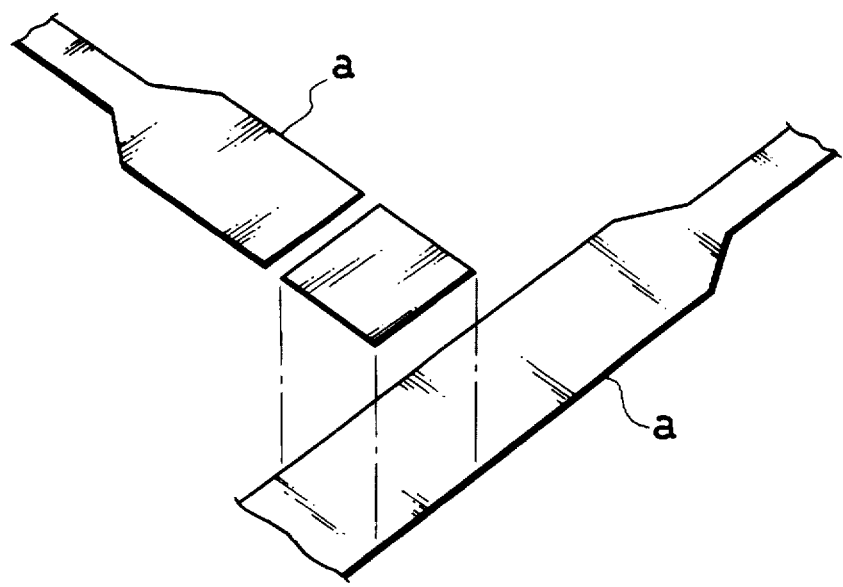
FIG. 18A is a diagram showing the lamination of widened webs.
Figure 18B:
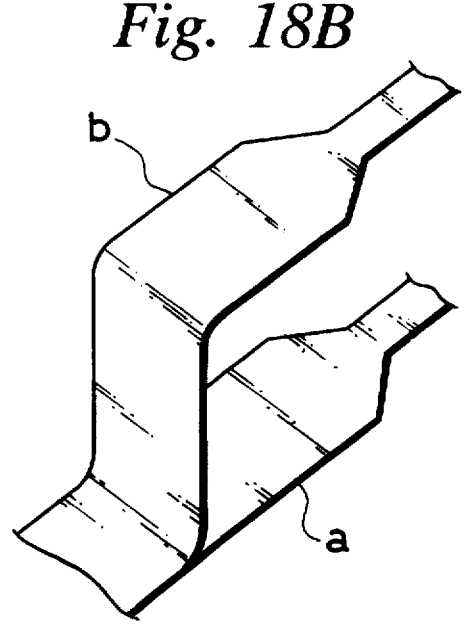
FIG. 18B is another diagram showing the lamination of widened webs.

FIG. 17A shows a slit web before widening as an example of the web 2 used and FIG. 17B shows the slit web shown in FIG. 17A widened by the widening apparatus shown in FIGS. 1 and 2 or the widening apparatus shown in FIGS. 3 and 4. The slit web is prepared by forming slits in a film discontinuously in a longitudinal direction and drawing it in a slit direction. In these figures, 2d denotes a slit and 2e a fiber.

A description is subsequently given of the function of the widening apparatus 1 illustrated in these figures. The web 2 is the split web shown in FIG. 16A which has a three-layer structure consisting of a center portion made from high-density polyethylene and both outer portions made from low-density polyethylene and a thickness of 30 to 70 μm. The 600 mm-wide web 2 let out from the roll 3 begins to expand from the tension control sensor roll 7 and travels toward the widening tool 9 while expanding at an almost fixed angel δ as shown in FIGS. 2 or 4. The widening tool 9 rotates by its contact with the web 2.

The reciprocating stroke of the widening plates 18, 19 of the widening tool 9 in the axial direction of the shaft is about 30 mm and an increase in the width of the web 2 directly expanded by the widening tool 9 is not so large. However, a succeeding portion of the web 2 is pulled by a leading portion and begins to expand from a turn roll of the tension control sensor roll 7 before it reaches the widening tool 9. Therefore, the widening function of the widening tool is accumulated. Along with the expansion of the width of the web 2, the fibers (2b and 2c of FIG. 16B) are inclined more, whereby a width shrinking function by travelling tension increases and a widening ratio that both width expanding and shrinking functions are balanced is obtained.

Then, if the distance between the tension control sensor roll 7 and the widening tool 9 is made large enough, a high widening ratio can be obtained. In the case of the above web 2, a widening ratio of 3 to 4 times can be easily obtained. However, since a central portion of the web 2 tends to be excessively widened by the widening tool 9, it is preferred that the widening ratio should be controlled to 2 times or so at the position of the widening tool 9 and the web is further widened by the cross guiders 11 to make the apertures uniform along the entire width of the web. Therefore, the width of the web 2 which is 600 mm at the position of the tension control sensor roll 7 is expanded to 1,200 mm or so at the position of the widening tool 9. The expanding angle δ is greatly influenced by the type and properties of the web. If the angle is too large, the central portion of the web will have a too large aperture and will be easily torn. In the case of the above web 2, the expanding angle δ is advantageously not more than 10°.

In the widening tool 1 of the second embodiment, as described above, two curved bodies 12 are disposed after the cross guiders 11. As a matter of course, one curved body or three or more curved bodies may be arranged according to purpose. When a larger number of curved bodies are used, handling becomes complicated and costs increase though the total function of the curved bodies becomes large even by making mild the conditions of each curved body. In the case of a widening apparatus using two curved bodies shown in FIGS. 3 and 4, stress is placed on the manufacture of a more uniformly widened web by finely controlling the apertures and the widening function is very small.

To reduce the size of the entire apparatus, the unrotatable guide rod 10 is present after the widening tool 9 and greatly curves the travelling direction of the web 2. In this case, a rotary turn roll is generally used as a guide rod. However, in this case, as the web contacts the surface of the turn roll in a relatively stationary state when the turn roll is used, stationary friction works there and the web hardly slides in an axial direction of the turn roll, thereby making it difficult to expand the width of the web at an upstream of the turn roll. As a result, as shown by broken lines in FIG. 2, the width of the web is not expanded. Therefore, the expanding angle of the web between the turn roll and the cross guiders 11 becomes large and a strain is thereby produced. To avoid this, the distance between the turn roll and the cross guiders 11 must be increased, resulting in a bulky apparatus. When the unrotatable guide rod 10 is used, sliding friction works between the guide rod 10 and the web 2, the friction coefficient in an axial direction thereof is greatly reduced, and the web widens continuously as shown by solid lines.

This can be always said when a guide roll member for changing the travelling direction is required in a section where an widening operation is carried out. In this case, an unrotatable rod may be used in place of the turn roll. As a matter of course, it is desired that the surface of the rod be made from a material which is slippery and hardly worn out (such as Teflon or super high density polyethylene). Thus, the web 2 is widened to about 4 times the original width thereof after it passes through the cross guiders 11 from the guide rod 10. Thereafter, the apertures are finely controlled simultaneously with a widening operation by the curved bodies 12 in the widening apparatus 1 of the second embodiment. In the case of FIGS. 3 and 4, widening is rarely carried out by the curved bodies 12 due to the characteristic properties of the web, and stress is laid on the fine adjustment of the apertures and the function of preventing the web from falling off from the cross guiders when the width of the web is not fully expanded for some reason or other in the curved bodies 12.

In the apparatus of the first embodiment and the apparatus of the second embodiment, distortion produced by widening is removed by the annealing roll 15 and the apertures are made more uniform by the shrinkage of the fibers due to the applied heat at the same time. Thus, the widened web 2 is supplied to the next step.

Depending on the properties of the web 2, the expansion of the web 2 right before the cross guiders 11 may be too small or too large due to changes in the properties and tension of the web and further the interaction with the on/off operation of the cross guiders, and the web 2 may thereby fall off from the cross guiders 11 or the expanded width of the web 2 may be greatly nonuniform. In this case, a web width detection sensor 44 is provided between the widening tool 9 and the cross guiders 11 as detection means for measuring the width of the web. Alternatively, the frequency of the opening and closing operations of each of the cross guiders 11 during a predetermined time is detected, a signal indicative of the frequency is supplied to the control means 28, and the control means 28 controls the widening function of the widening tool 9 so that the width of the web at the detection position becomes a predetermined width. Automatic control by the widening tool is made possible by feeding back the result of detection.

The web width detection sensor 44 is selected from a contact sensor, a photoelectric sensor, an image sensor, an air flow type sensor and the like to suit a web of interest. Depending on the type of a web, use of a tool having a widening function, such as a screw roll, a bowed roll, an arc bar (R bar) or the like in conjunction with the widening tool is effective in some cases.

As described above, the feature of the web widening apparatus of the present invention is to comprise: a widening tool having: a shaft; a plurality of widening plates in contact with a travelling web to be widen, arranged in parallel to one another around said shaft, the widening plates comprising a first group and a second group of widening plates which can rotate around the shaft and move in an axial direction of the shaft, said second group of widening plates being separated from and facing said first group of widening plates in the axial direction of the shaft; and guide means for moving the first and second groups of widening plates in the axial direction of the shaft so that the interval between the widening plates of the first and second groups in the axial direction of the shaft expands gradually along with the rotation of the widening plates and then narrows; and a pair of cross guider which can nip both side end portions of the travelling web and face each other in a width direction of the web.

Thereby, the present invention provides practically excellent effects that a web widening apparatus which is much more inexpensive, smaller in size, handled easier and more reliable than the web widening apparatus of the prior art can be obtained, defects which are encountered when a widening tool and cross guiders are used alone have been overcome, and the web can be widened properly.

It would be apparent to those skilled in the art that various modifications and variations can be made in the web widening apparatus of the present invention without departing from the spirit or scope of the invention. It is intended that the present invention covers the modifications and variations of this invention provided they come within the scope and spirit of the appended claims and their equivalents.

What is claimed is:

1. A web widening apparatus comprising:

a widening tool having: a shaft; a plurality of widening plates in contact with a travelling web to be widened, arranged in parallel to one another around said shaft, the widening plates comprising a first group and a second group of widening plates which can rotate around the shaft and move in an axial direction of the shaft, said second group of widening plates being separated from and facing said first group of widening plates in the axial direction of the shaft; and guide means for moving the first and second groups of widening plates in the axial direction of the shaft so that the interval between the widening plates of the first and second groups in the axial direction of the shaft expands gradually along with the rotation of the widening plates and then narrows; and a pair of cross guiders which can nip both side end portions of the travelling web and face each other in a width direction of the web.

2. The web widening apparatus of claim 1, which further comprises a curved body having spiral web-guide means for guiding the web, said spiral web-guide means being symmetrical in the width direction of the web from a central portion thereof and being in contact with the travelling web toward the width direction of the web such that the spiral web-guide means can rotate.

3. The web widening apparatus of claim 2, wherein the spiral web-guide means of the curved body rotates at a predetermined speed higher than the speed of the travelling web.

4. The web widening apparatus of claim 1, wherein the guide means move the first and second groups of widening plates symmetrically in the axial direction of the shaft.

5. The web widening apparatus of claim 1, wherein the guide means move the first group of widening plates and the second group of widening plates at different distances along the axial direction of the shaft.

6. The web widening apparatus of claim 1, wherein a contact portion with the web of each of the first and second groups of the widening plates has a curved surface and the curved surfaces of the widening plates are arranged around the shaft continuously to form them as a peripheral surface of a substantially cylindrical body.

7. The web widening apparatus of claim 1, wherein a contact portion with the web of each of the first and second groups of the widening plates has a flat surface and the flat surfaces of the widening plates are arranged around the shaft continuously to form them as a peripheral surface of a substantially polygonal column body.

8. The web widening apparatus of claim 1, wherein the guide means comprises cam boards which are connected to the widening plates rotating around the shaft such that they can be in slide contact with the cam boards and can be inclined with respect to the shaft, and inclination units for inclining the cam boards with respect to the shaft.

9. The web widening apparatus of claim 1, wherein said widening tool comprises another plurality of widening plates which are interposed between the first group of widening plates and the second group of widening plates, can rotate around the shaft and do not move in the axial direction of the shaft.

10. The web widening apparatus of claim 1, wherein each of said cross guiders comprises a pair of rolls, arranged in a thickness direction of the web, for nipping a side end portion of the travelling web such that the web can travel.

11. The web widening apparatus of claim 10, wherein the cross guider is arranged such that the axis of one roll and the axis of the other roll are within the same plane and one of the rolls is inclined to the other one such that a space between the ends of the rolls is opened slightly toward the center of the travelling web.

12. The web widening apparatus of claim 1, which further comprises heating means for heating the travelling web before and/or during the widening of the web.

13. The web widening apparatus of claim 1, which further comprises an unrotatable guide rod which is in contact with the web being widened.

14. The web widening apparatus of claim 1, which further comprises detection means for detecting the width of the widened web and control means for operating the guide means such that the width of the web is adjusted to a predetermined width in accordance with the output of the detection means in the travelling course of the web.

15. The web widening apparatus of claim 14, wherein each of the cross guiders comprises opening/closing means for opening and closing a space between the pair of rolls by inclining one of the rolls of the cross guiders to the other one according to the position of the side end portion of the web and the control means operates the guide means such that the width of the web is adjusted to a predetermined width in accordance with the frequency of opening and closing operations of the space between the ends of the rolls of the cross guider within a predetermined time.

16. The web widening apparatus of claim 2, wherein the curved body comprises a curved roll on which said spiral web-guide means is formed as a groove.

17. The web widening apparatus of claim 2, wherein the curved body comprises a curved roll around which said spiral web-guide means is provided as a spiral convex portion.

18. The web widening apparatus of claim 17, wherein said spiral convex portion for said spiral web-guide means is formed of a spiral linear material.

19. The web widening apparatus of claim 3, wherein the guide means move the first and second groups of the widening plates symmetrically in the axial direction of the shaft.

20. The web widening apparatus of claim 3, wherein the guide means move the first group of widening plates and the second group of widening plates at different distances along the axial direction of the shaft.

21. The web widening apparatus of claim 3, wherein a contact portion with the web of each of the first and second groups of the widening plates has a curved surface and the curved surfaces of the widening plates are arranged around the shaft continuously to form them as a peripheral surface of a substantially cylindrical body.

22. The web widening apparatus of claim 3, wherein a contact portion with the web of each of the first and second groups of the widening plates has a flat surface and the flat surfaces of the widening plates are arranged around the shaft continuously to form them as a peripheral surface of a substantially polygonal column body.

23. The web widening apparatus of claim 3, wherein the guide means comprises cam boards which are connected to the widening plates rotating around the shaft such that they can be in slide contact with the cam boards and can be inclined with respect to the shaft, and inclination units for inclining the cam boards with respect to the shaft.

24. The web widening apparatus of claim 3, wherein said widening tool comprises another plurality of widening plates which are interposed between the first group of widening plates and the second group of widening plates, can rotate around the shaft and do not move in the axial direction of the shaft.

25. The web widening apparatus of claim 3, wherein each of said cross guiders comprises a pair of rolls, arranged in a thickness direction of the web, for nipping a side end portion of the travelling web such that the web can travel.

26. The web widening apparatus of claim 25, wherein the cross guider is arranged such that the axis of one roll and the axis of the other roll are within the same plane and one of the rolls is inclined to the other one such that a space between the ends of the rolls is opened slightly toward the center of the travelling web.

27. The web widening apparatus of claim 3 which further comprises heating means for heating the travelling web before and/or during the widening of the web.

28. The web widening apparatus of claim 3 which further comprises an unrotatable guide rod which is in contact with the web being widened.

29. The web widening apparatus of claim 3 which further comprises detection means for detecting the width of the widened web and control means for operating the guide means such that the width of the web is adjusted to a predetermined width in accordance with the output of the detection means in the travelling course of the web.

30. The web widening apparatus of claim 29, wherein each of the cross guiders comprises opening/closing means for opening and closing a space between the pair of rolls by inclining one of the rolls of the cross guiders to The other one according to the position of the side end portion of the web and the control means operates the guide means such that the width of the web is adjusted to a predetermined width in accordance with the frequency of opening and closing operations of the space between the ends of the rolls of the cross guider within a predetermined time.

31. The web widening apparatus of claim 3, wherein the curved body comprises a curved roll on which said spiral web-guide means is formed as a groove.

32. The web widening apparatus of claim 3, wherein the curved body comprises a curved roll around which said spiral web-guide means is provided as a spiral convex portion.

33. The web widening apparatus of claim 32, wherein said spiral convex portion for said spiral web-guide means is formed of a spiral linear material.

* * * * *

UNITED STATES PATENT AND TRADEMARK OFFICE
CERTIFICATE OF CORRRECTION

Page 1 of 2

PATENT NO. : 5,791,030
DATED : August 11, 1998
INVENTOR(S) : Kintaro Aihara, et al.

It is certified that error appears in the above-identified patent and that said Letters Patent is hereby corrected as shown below:

At [56] References Cited, please add the following patents and publications

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 3 | 7 | 1 | 3 | 1 | 9 | 0 | 1/30/73 | Yazawa, et al. | | | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 4 | 6 | 4 | 3 | 2 | 7 | 5 | 12/21/71 | Japan | | | | |
| | | | | | | | | | | | | | | |

UNITED STATES PATENT AND TRADEMARK OFFICE
CERTIFICATE OF CORRRECTION

PATENT NO. : 5,791,030
DATED : August 11, 1998
INVENTOR(S) : Kintaro Aihara, et al.

It is certified that error appears in the above-identified patent and that said Letters Patent is hereby corrected as shown below:

OTHER DOCUMENTS

| | | |
|---|---|---|
| | | Product Information of Toyo Kikai Tsusho Kabushiki Kaisa, Toyo Machinery Co., Ltd. (5 different kinds - TK No. 130, TK No. 143, TK No. 144, TK No. 147, and Drawing No. 33347-100J) |
| | | |

Signed and Sealed this

Twenty-third Day of February, 1999

Attest:

Q. TODD DICKINSON

*Attesting Officer*   *Acting Commissioner of Patents and Trademarks*